United States Patent
Packer

(10) Patent No.: US 7,421,498 B2
(45) Date of Patent: Sep. 2, 2008

(54) METHOD AND SYSTEM FOR URL BASED FILTERING OF ELECTRONIC COMMUNICATIONS AND WEB PAGES

(75) Inventor: Alan Packer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 10/647,824

(22) Filed: Aug. 25, 2003

(65) Prior Publication Data
US 2005/0050222 A1 Mar. 3, 2005

(51) Int. Cl.
G06F 15/16 (2006.01)
G06F 15/173 (2006.01)

(52) U.S. Cl. ............ 709/225; 709/206; 709/224; 709/229; 709/239

(58) Field of Classification Search .......... 709/217, 709/223, 224, 229, 203, 225, 232; 713/201
See application file for complete search history.

(56) References Cited

U.S. PATENT DOCUMENTS

| | | | |
|---|---|---|---|
| 5,706,507 A | 1/1998 | Schloss | |
| 5,724,567 A | 3/1998 | Rose et al. | |
| 5,835,905 A | 11/1998 | Pirolli et al. | |
| 5,870,744 A | 2/1999 | Sprague | |
| 5,911,043 A | 6/1999 | Duffy et al. | |
| 6,163,778 A | 12/2000 | Fogg et al. | |
| 6,233,618 B1 | 5/2001 | Shannon | |
| 6,249,785 B1 | 6/2001 | Paepke | |
| 6,266,664 B1 | 7/2001 | Russell-Falla et al. | |
| 6,285,999 B1 | 9/2001 | Page | |
| 6,453,327 B1 | 9/2002 | Nielsen | |
| 6,473,753 B1 | 10/2002 | Katariya et al. | |
| 6,571,275 B1 | 5/2003 | Dong et al. | |
| 6,665,659 B1 | 12/2003 | Logan | |
| 6,684,254 B1 | 1/2004 | Dutta | |
| 6,701,350 B1 * | 3/2004 | Mitchell | 709/217 |
| 6,745,367 B1 | 6/2004 | Bates et al. | |

(Continued)

FOREIGN PATENT DOCUMENTS

DE 10024733 A1 11/2001

(Continued)

OTHER PUBLICATIONS

"Look Ahead Filtering of Internet Content," IBM Technical Disclosure Bulletin, vol. 40, No. 12, Dec. 1, 1997, pp. 143, New York, U.S.A.

(Continued)

Primary Examiner—Quang N. Nguyen
(74) Attorney, Agent, or Firm—Senniger Powers LLP

(57) ABSTRACT

A system and method for handling an electronic communication such as an email, an instant message or a chat room statement. Instructions receive and parse the electronic communication. URLs within the parsed electronic communication are identified and categorized as appropriate or inappropriate. The electronic communication is routed as a function of the categorized URLs—appropriate electronic communications are routed to the addressee; inappropriate electronic communications have controlled access. Also included is a system and method for controlling access by third parties to web pages including instructions for parsing a web page, identifying URLs within the parsed web page, categorizing the identified URLs, and permitting third parties to access the web page as a function of the categorized URLs.

31 Claims, 7 Drawing Sheets

U.S. PATENT DOCUMENTS

| | | | | |
|---|---|---|---|---|
| 6,772,214 | B1* | 8/2004 | McClain et al. | 709/229 |
| 6,854,074 | B2* | 2/2005 | McLellan et al. | 709/224 |
| 6,976,070 | B1* | 12/2005 | Hoashi et al. | 709/224 |
| 7,117,358 | B2* | 10/2006 | Bandini et al. | 709/232 |
| 7,194,464 | B2* | 3/2007 | Kester et al. | 709/223 |
| 2002/0116641 | A1* | 8/2002 | Mastrianni | 713/201 |
| 2002/0120754 | A1 | 8/2002 | Anderson et al. | |
| 2003/0093518 | A1* | 5/2003 | Hiraga | 709/229 |
| 2003/0163731 | A1* | 8/2003 | Wigley et al. | 713/201 |
| 2005/0022008 | A1* | 1/2005 | Goodman et al. | 713/201 |
| 2005/0240618 | A1 | 10/2005 | Nickerson et al. | |

FOREIGN PATENT DOCUMENTS

| | | |
|---|---|---|
| EP | 1076299 A2 | 2/2001 |
| WO | WO 00/68833 A2 | 11/2000 |
| WO | WO 01/90932 A2 | 11/2001 |

OTHER PUBLICATIONS

Qiu et al., "Using Link Types in Web Page Ranking and Filtering," Web Information Systems Engineering, 2001, Proceedings of the Second International Conference, vol. 1, Dec. 3, 2001, pp. 311-320.

Soumen et al., "Enhanced Hypertext Categorization Using Hyperlinks," Sigmod Record, Jun. 1998, vol. 27, No. 2, pp. 307-318, Croatian Soc. Chem. Eng., Croatia.

Oh et al., A Practical Hypertext Categorization Method Using Links and Incrementally Available Class Information, Jul. 24, 2000, vol. 34, pp. 264-271, U.S.A.

Cobion; "OrangeBox Mail—All Around Protection for Your Comapny's E-Mail," published at least as early as Jun. 20, 2003 by Cobion AG; 4-pgs.

Cobion; "OrangeBox Mail 2.0—User Manual," Version 1.2, published at least as early as Jun. 20, 2003 by Cobion AG; pp. Table of Contents through 135.

"Cobion to Unveil Anti-Spam Product for Businesses and Home Web Filtering Product for ISPs," published by Primeur Monthly on Mar. 12, 2003 and available on-line at www.hoise.com/primeur/03/articles/monthly/AE-PR-04-03-46.html.

Jacob, V. et al., "Filtering Objectionable Internet Content," International Conference on Information Systems, Proceedings of the 20th International Conference on Information Systems, 1999, pp. 274-278.

Dumais, S., et al., "Hierarchical Classification of Web Content," Annual ACM Conference on Research and Development in Information Retrieval, Proceedings of the 23rd Annual International ACM SIGIR Conference on Research and Development in Information Retrieval, 2000, pp. 256-263.

Cobion, "OrangeBox Mail—All Around Protection for Your Company's E-Mail," published at least as early as Jun. 20, 2003 by Cobion AG, 4 pages.

Cobion, "OrangeBox Mail 2.0—User Manual," Version 1.2, published at least as early as Jun. 20, 2003 by Cobion AG, pp. Table of Contents through 135.

"Cobion to Unveil Anti-Spam Product for Businesses and Home Web Filtering Product for ISPs," published by Primeur Monthly on Mar. 12, 2003 and available on-line at www.hoise.com/primeur/03/articles/monthly/AE-PR-04-04-46.html.

Resnick, et al., *PICS: Internet Access Controls Without Censorship*, Communications of the Association for Computing Machinery, Oct. 1996, pp. 87-93, vol. 39, No. 10, Communications of the Association for Computing Machinery, New York.

\* cited by examiner

METHOD AND SYSTEM FOR URL BASED FILTERING OF ELECTRONIC COMMUNICATIONS AND WEB PAGES

TECHNICAL FIELD

Embodiments of the present invention relate to the field of communications filtering based on content and web page management and control based on content. In particular, embodiments of this invention relate to evaluating the appropriateness of a particular electronic communication or a web page of a website based on its content.

BACKGROUND OF THE INVENTION

Any internet application is a candidate for abuse and annoyance by spammers who solicit visitors for their websites. In addition to sending email and other communications, spammers also target chat rooms and instant messaging programs by writing "bots" (programs designed to act like a person) that try to solicit visitors to websites. In addition, solicitors disguise the actual content of their websites by giving the site a front or look which would appear to be more appropriate in order to sell products and/or services that are inappropriate.

Pornographic email and spam are becoming increasingly offensive to clients, with hypertext markup language (HTML) based messages containing graphic images and descriptions sent to millions of users regardless of their age or interests. Similarly, chat rooms and instant messaging programs are targeted by spammers, who write "bots" (programs designed to act like a person) that try to solicit visitors to websites. The solicitations are not always pornographic—they may be any type of unsolicited commercial offering—offers to purchase Viagra or other prescription drugs, applications for credit cards, or weight loss programs for example.

Some known systems develop lists of appropriate and inappropriate website and sources of electronic communication. However, these systems can be circumvented by spammers that vary their source address or hide the content that they are offering.

Usability studies indicate pornographic email, spam, and pornographic solicitations in messaging applications and in chat rooms are a major cause of dissatisfaction and churn to users. There is a need to address this problem in order to improve the user's experience. Controlling such electronic communications and websites translates into lower churn and higher revenues for internet service providers.

Accordingly, a system for filtering electronic communications and websites is desired to address one or more of these and other disadvantages.

SUMMARY OF THE INVENTION

Electronic communications and web pages of inappropriate content tend to share a common characteristic: they contain URLs (uniform resource locators) that, when selected, deliver the client to the spammer's web page. One embodiment of the invention involves parsing electronic communications and web pages in applications that are not primarily for the function of viewing web pages, searching for URLs, and using a software development kit called the Online Lookup Toolkit to look up the URLs. If a sufficient number, rating or percentage of the URLs are categorized as "inappropriate," such a electronic communication is either blocked or logged for parental examination. If a sufficient number, rating or percentage of the URLs of a web page are categorized as "inappropriate," such URLs are either segregated, removed or blocked.

Microsoft Corporation owns a very large database of categorized URLs, used for MSN's Parental Controls and web content filtering. The database contains nearly 30 million URLs, representing public web pages on the World Wide Web, and category labels indicating membership in "inappropriate" categories, i.e. categories of content inappropriate for viewing by children. These categories include pornography, hate speech, mature content, drugs, etc. In the future, the categories may include those favored by spammers, such as Viagra sales, credit card offers, etc. The contents of the database are served up online through custom lookup servers, called Category Name Service servers, or CNS servers. Applications access the lookup servers with a software development kit (SDK) called the Online Lookup Toolkit. The system is called the Online Lookup Service, or OLS.

In the case of email, one embodiment of the invention involves scanning email messages at either the mail server or mail client, before delivering them to the addressee. For instant messaging or chat rooms, individual test messages can be intercepted either at the time a client (or a bot masquerading as a client) sends the message, or before delivery to the message's recipient. In the case of web pages, one embodiment of the invention involves evaluating the content of the web page. If the text message or web page contains one or more URLs, they can be extracted and looked up against the OLS, and the message can be blocked as inappropriate or allowed as appropriate.

In accordance with one embodiment of the invention, a system provides for handling an electronic communication. The system includes instructions for:
  receiving the communication;
  parsing the received communication;
  identifying URLs within the parsed communication;
  categorizing the identified URLs; and
  routing the communication as a function of the categorized URLs.

In accordance with one embodiment of the invention, a system provides for controlling access by third parties to web pages of a website. The system includes instructions for:
  parsing pages within a website;
  identifying URLs within the parsed web pages;
  categorizing the identified URLs; and
  permitting third parties to access the web pages as a function of the categorized URLs.

In accordance with one embodiment of the invention, a system provides for handling an email. The system includes instructions for:
  receiving the email;
  parsing the received email;
  identifying URLs within the parsed email;
  looking up a rating for each of the identified URLs;
  designating certain of the identified URLs as inappropriate
  assigning a number to each identified URL based on its appropriateness; and
  permitting the client to access the email when the assigned number or the number of inappropriate URLs is below a threshold.

In accordance with one embodiment of the invention, a system provides for handling an email. The system includes instructions for:
  receiving the email;
  parsing the received email;
  identifying URLs within the parsed email;
  looking up a rating for each of the identified URLs;

designating certain of the identified URLs as inappropriate or assigning a number to each identified URL based on its inappropriateness; and inhibiting the client to access the email when the assigned number or the number of inappropriate URLs is at or above the threshold.

In accordance with one embodiment of the invention, a client side hardware system is provided. The system includes a client computer having a memory and having capability for receiving electronic communications from a source for presentation to a client. The system further includes:

instructions for receiving electronic communications from a source and storing the received electronic communications in the memory while initially inhibiting client access to the electronic communications;

instructions for categorizing the stored electronic communications based on the URLs therein; and instructions for permitting client access to a particular electronic communication as a function of the category of the electronic communication.

In accordance with one embodiment of the invention, a server side hardware system is provided. The system includes a server computer having a memory and having capability for receiving electronic communications from a source for presentation to a client. The system further includes:

instructions for receiving electronic communications from a source and storing the received electronic communications in the memory;

instructions for categorizing the stored electronic communications based on the URLs therein; and instructions for selectively sending a particular electronic communication to the client as a function of the categorization of the electronic communication.

In accordance with one embodiment of the invention, a server side hardware system is provided. The system includes a server computer presenting a plurality of websites having web pages on a network and having the capability of controlling a client's access to the pages of the websites. The system further includes:

instructions for periodically categorizing the web pages based on URLs therein; and instructions for permitting client access to a particular web page as a function of the categorization of the web page.

In accordance with one embodiment of the invention, a computer readable medium for handling an electronic communication is provided. The medium includes instructions for:

receiving the communication;
parsing the received communication;
identifying URLs within the parsed communication;
categorizing the identified URLs; and
routing the communication as a function of the categorized URLs.

In accordance with one embodiment of the invention, a computer readable medium for controlling access by third parties to web pages of a website is proved. The medium includes instructions for:

parsing pages within a website;
identifying URLs within the parsed web pages;
categorizing the identified URLs; and
permitting third parties to access the web pages as a function of the categorized URLs.

In accordance with one embodiment of the invention, a computer readable medium for handling an email is provided. The medium includes instructions for:

receiving the email;
parsing the received email;
identifying URLs within the parsed email;
looking up a rating for each of the identified URLs;
designating certain of the identified URLs as inappropriate or assigning a number to each identified URL based on its inappropriateness; and permitting the client to access the email when the assigned number or the number of inappropriate URLs is below a threshold or inhibiting the client to access the email when the assigned number or the number of inappropriate URLs is at or above the threshold.

Alternatively, one embodiment of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
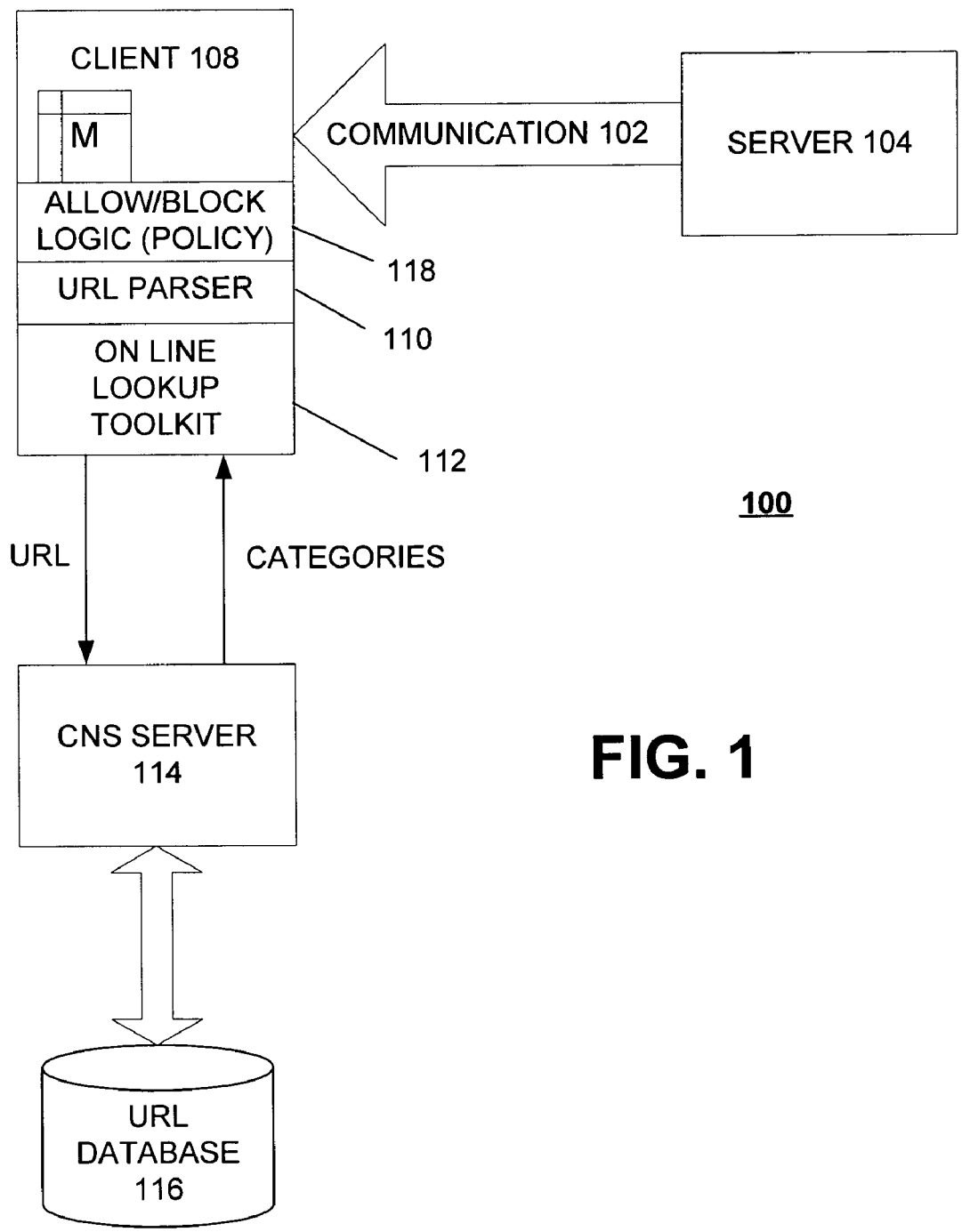
FIG. 1 is a block diagram of an exemplary embodiment of a client based system according to one embodiment of the invention for URL filtering of electronic communications.
Figure 2:
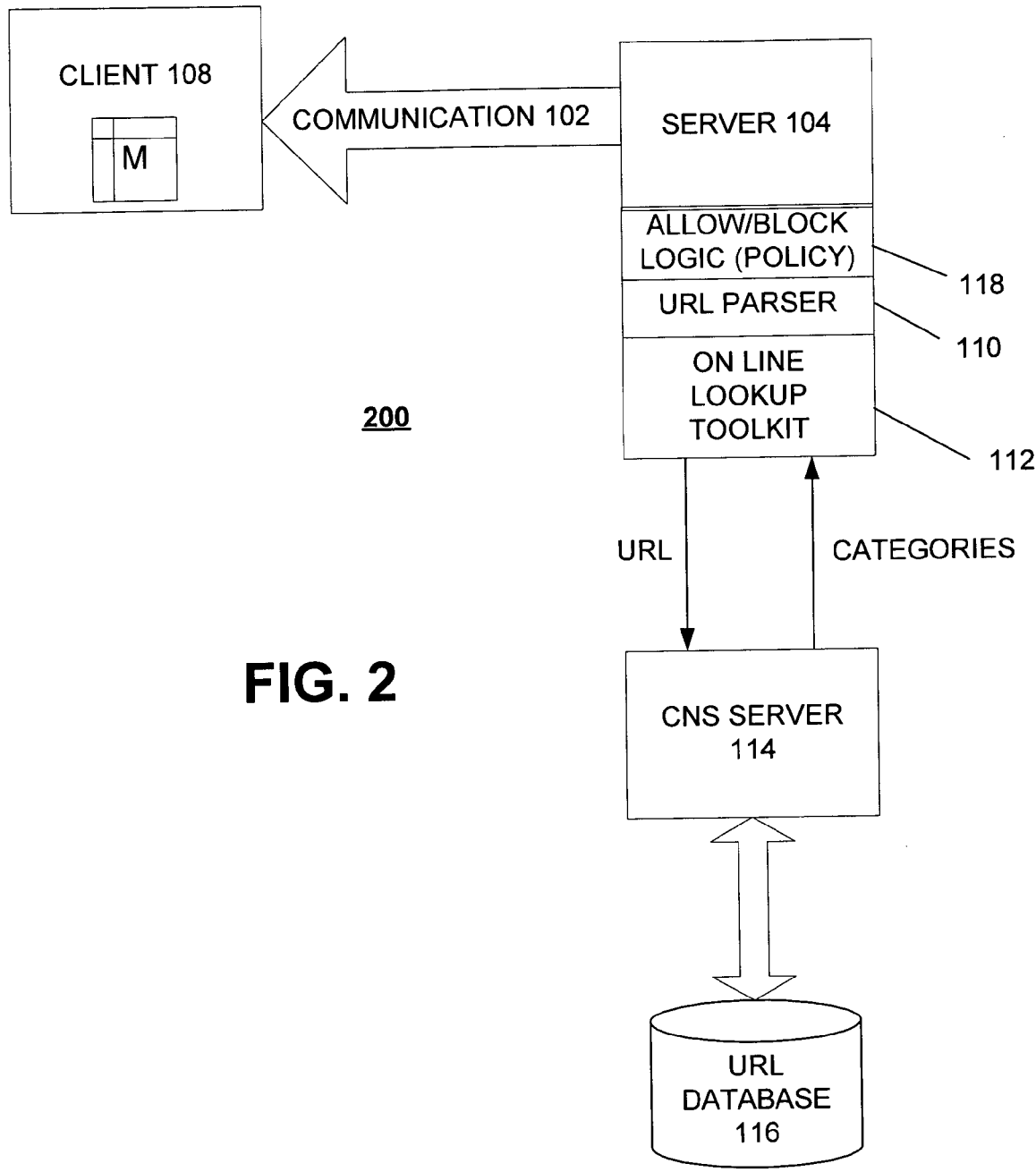
FIG. 2 is a block diagram of an exemplary embodiment of a server based system according to the invention for URL filtering of electronic communications.

Referring to FIG. 1, a system 100 handles an electronic communication 102 such as an email, an instant message or a chat room statement provided by a server 104 over a network. The system 100 is illustrated as implemented on a client's computer and controls whether an electronic communication which names the client as an addressee should be provided to the client. As indicated herein and as is known by those skilled in the art, the system 100 may also be implemented on a server (as shown in FIG. 2) or in any other configuration that allows it to evaluate the electronic communication 102 and control its routing.

As part of the software instructions operating the client computer 108, included are instructions for receiving the electronic communication 102. Depending on the type of electronic communication, this may be an email application, an instant messaging program or a chat room program or any other application for receiving a electronic communication. A URL parser 110 breaks up each received electronic communication into smaller chunks to identify the URLs within the electronic communication. URL parsers are well known and are applied to the electronic communication to identify the URLs therein.

The software also includes instructions for categorizing the identified URLs. For example, the client computer 108 may include an on line lookup tool kit (OLTK) 112 for communicating with a category name service (CNS) server 114. The OLTK is an SDK that presents an application programming interface (API) that allows looking up one or more URLs and returns back category rating information for those URLs. The OLTK opens a socket to the CNS server and uses the HTTP protocol to transmit the URL(s) and receive the ratings. In one form, it is implemented as a .NET web service, so that it transmits and receives XML over HTTP.

The server 114 is connected to a URL database 116 which includes a list of URLs and a rating (such as an assigned number) or category for each URL in the database 116. In one embodiment, the assigned number is a rating value for a given category. For example, it may be an assigned number between 0 and 100 representing a confidence value or probability that the URL is a member of the inappropriate category in question. Further, there may be an assigned number for each supported category. For example, a URL that has a sexually oriented word within it might have ratings of PORN:100, ALCOHOL 0, MATURE CONTENT 75, VIOLENCE 0, etc.

In one embodiment, the URL parser 110 presents each URL found in the electronic communication to the tool kit 112, which passes the URLs to the server 114, which, in turn, looks up the category or rating in the database 116 and provides the category or rating information to the tool kit 112. In the event that the database does not have the URL listed or a category or rating for it, the server 114 will indicate that the URL is unrated. Alternatively, the CNS server 114 may attempt to rate the URL before responding or after responding, depending on the amount of time required to complete the rating.

The rating provided to each electronic communication depends on the purpose of the filtering. In one aspect relating to the control of content to minors, it is contemplated that each URL can have a zero or more category rating. For each application, a category might be considered appropriate or inappropriate. The CNS server does not necessarily return a rating of appropriate or inappropriate. It may assign a number to each identified URL based on its inappropriateness. The application decides which categories (or assigned number or total number) are inappropriate based on the information provided. The extent to which a particular URL falls into one category or other depends on the rating criteria. For example, the percentage of inappropriate URLs may determine the handling of the electronic communication. If the percentage of inappropriate URLs meets or exceeds a threshold level (e.g., 50% or 10% or some other percentage), access to the electronic communication is limited to system administrators (e.g. parents) only and the electronic communication would be routed to the system administrator to a location where the administrator could access it but where client could not access it. In other words, the electronic communication is not routed to an addressee when the percentage of inappropriate URLs relative to the total of inappropriate and appropriate URLs of the electronic communication is greater than a threshold amount. It is also contemplated that the threshold amount may be a dynamic or weighted amount based on various factors and/or past experience. Also, the threshold may vary depend on the desires of the system administrator and it may be varied based on the profile of the client.

Another factor which may affect rating is subject matter. For example, the following categories of subject matter could be designated as unacceptable:
- on-line shopping
- marketing
- investing/real estate
- investing/stocks
- mortgage offers
- sexual aids
- impotence cures
- pornography
- gambling Additionally, the software includes instructions for routing the electronic communication as a function of the categorized URLs. For example, if all URLs of a particular electronic communication are inappropriate, access to the electronic communication is limited to system administrators and the electronic communication would be routed to the system administrator to a location where the administrator could access it but where client could not access it. As another example, if all URLs of a particular electronic communication are appropriate, access to the electronic communication is provided to the client or the electronic communication is routed to the client or to a location where the client can access the electronic communication.

Embodiments of the invention encompass other rating scenarios. For example, each URL may have a numerical rating and whether an electronic communication is routed to a client or inhibited may depend on the numerical ratings. For example, appropriate URLs may carry a zero rating and inappropriate URLs may carry a rating of 1 to 10. The total ratings of the URLs of an electronic communication would determine its handling. For example, if the total was greater than a threshold of 5, the electronic communication would not be available to the client.

In summary, the electronic communication is rated as a function of its identified URLs therein and the electronic communication is routed a function of the rating of the electronic communication. Electronic communications without URLs are considered appropriate and otherwise routed to the addressee.

The system includes a policy 118 including an allow/block logic. The policy determines when to route the electronic communication to the addressee when the policy indicates that the electronic communication passes the allow logic and fails the block logic. The policy 118 also determines when to inhibit routing of an electronic communication to an addressee when the policy indicates that the electronic communication fails the allow logic and passes the block logic.

The following is an example of a policy for an application that filters email:
messages that do not contain URLs are routed to the end-user;
messages that come from a trusted source are routed to the end-user;
messages that contain ANY pornographic URLs are blocked for children;
messages that contain more than 10% pornographic URLs are blocked for adult users;
messages that contain more than 20% of URLs that belong to some other inappropriate category are blocked for all users; etc.

In summary, a client system 100 as illustrated in FIG. 1 includes a client computer 108 having a memory M and having electronic communications capability for receiving electronic communications 102 from a source (server 104) for presentation to the client. The system 100 further includes instructions for receiving the electronic communications 102 from the server 104 and storing the received electronic communications 102 in the memory M while initially inhibiting client access to the electronic communications. The system 100 further includes instructions for categorizing the electronic communications 102 stored in the memory M based on the URLs in the electronic communication. The system 100 further includes instructions for routing the electronic communication to the client and/or permitting client access to a particular electronic communication 102 as a function of the category of the electronic communication. In one embodiment, the instructions are stored on a computer readable medium and accessed by the client computer 108.

One embodiment of the invention may also be implemented by a server system 200 as illustrated in FIG. 2. System 200 includes a server computer 104 having a memory M and having communications capability for receiving electronic communications 102 from a source (such as a network; not shown) for presentation to the client 108. The system 200 further includes instructions for receiving electronic communications from the source and for categorizing the electronic communications based on the URLs therein. As noted above, the URL parser 110 parses the electronic communication for URLs, the URLs are categorized by OLTK 112 via CNS server 114 accessing URL database 1116, and the electronic communication is rated by policy 118 based on the categories of the URLs. The system 200 further includes instructions for selectively sending a particular electronic communication 102 to the client 108 as a function of the rating or category of the electronic communication. In one embodiment, the instructions are stored on a computer readable medium and accessed by the server 104.

Figure 4:
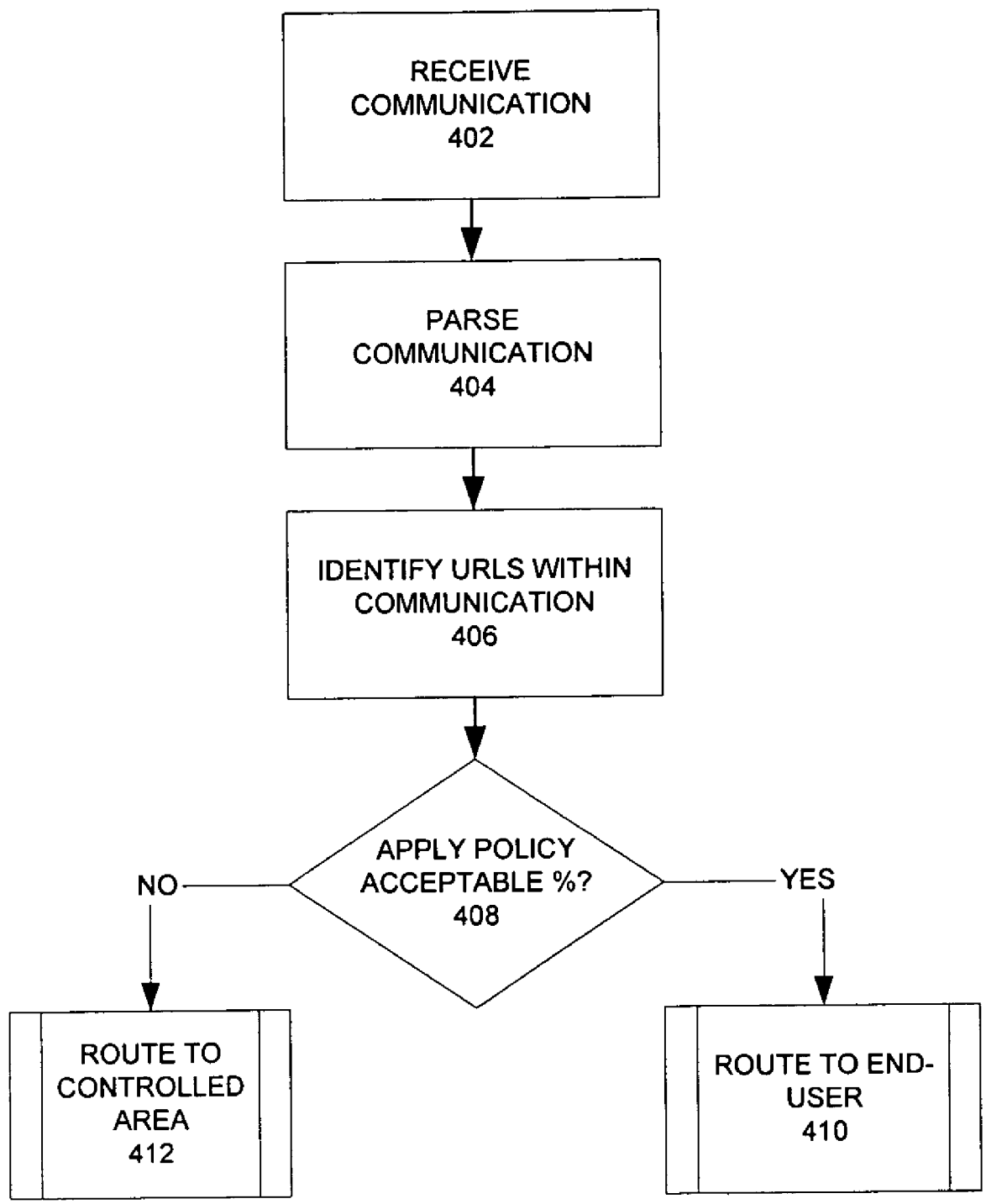
FIG. 4 is a flow chart of an exemplary embodiment of a method according to one embodiment of the invention for URL filtering of an electronic communication.

Referring to FIG. 4, operation of both the client system 100 and the server system 200 is illustrated. Specifically, both systems receive an electronic communication at 402. The electronic communication is parsed at 404. URLs within the parsed electronic communication are identified at 406. The policy is applied at 408. The electronic communication is routed to the client at 410 if the electronic communication passes the policy or is routed to a controlled area or deleted at 412 if the electronic communication fails the policy. For example, an email to a child may be routed to an adult whereas a chat message may be blocked (i.e., deleted).

Figure 3:
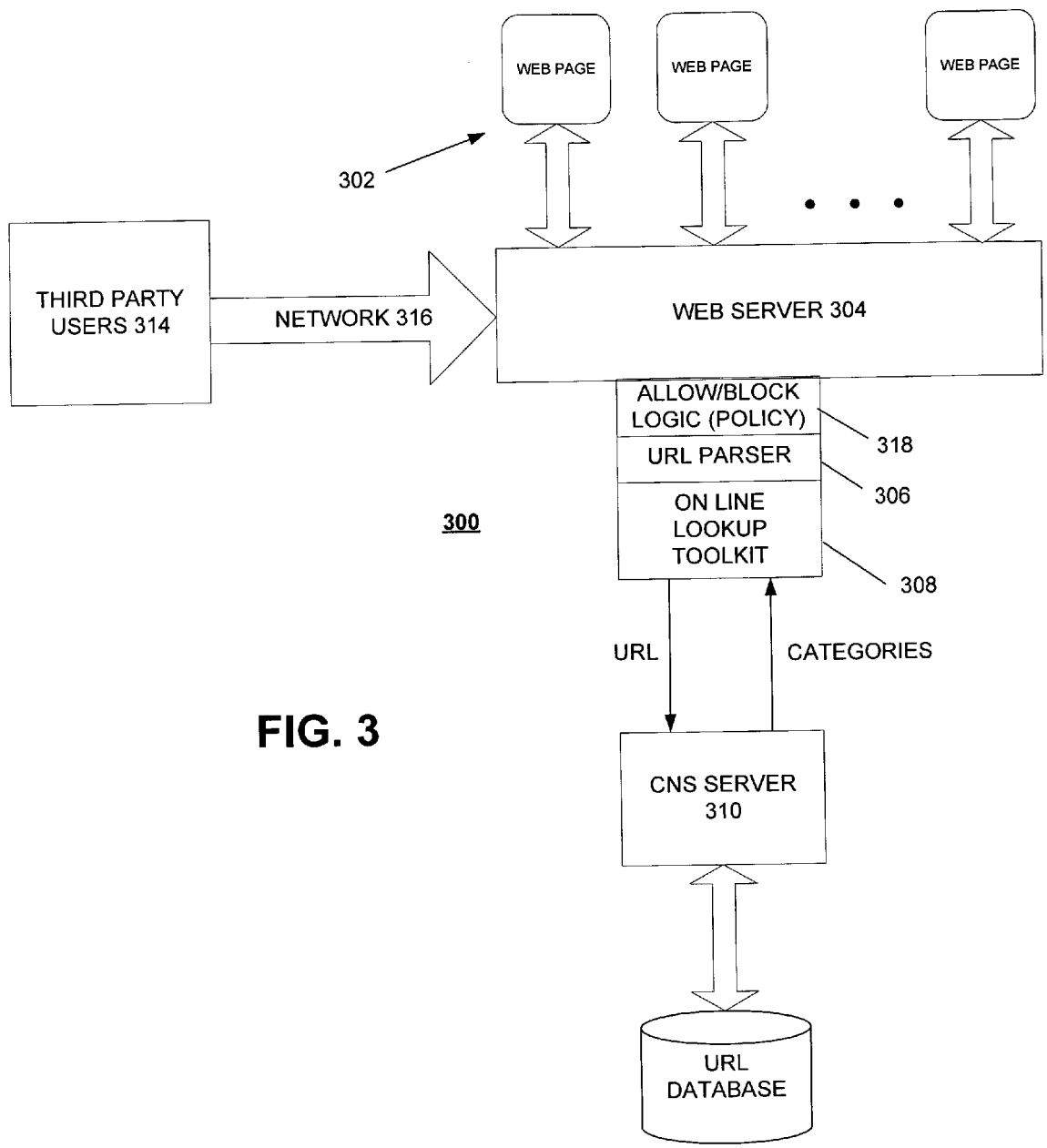
FIG. 3 is a block diagram of an exemplary embodiment of a server based system according to one embodiment of the invention for URL filtering to clean up websites which are owned by a provider (such as group websites) by segregating, removing or blocking inappropriate URLs and/or web pages.

The system and method according to one embodiment of the invention is also applicable to a web server which manages web pages of a website. In this embodiment, the invention controls the content of the web pages and controls access to the pages when the content of the pages is created by third parties independent of the control of the web server. Referring to FIG. 3, a system 300 is illustrated for controlling access by third parties to web pages 302 under the control of a web server 304. This system 300 is particularly useful for managing a group website or a home page website. As described herein, one embodiment of the invention relates to the parsing and access control of web pages. Other embodiments includes parsing and control of part of or an entire website or controlling access to a website based on the parsing and rating of one or more pages of the website.

The system includes instructions 306 for parsing each web page 302. URLs within the parsed web page are identified and categorized, as noted above, by a OLTK 308, CNS server 310 and URL database 312. Third party users 314 are permitted to access the web page as a function of the categorized URLs. As noted above with regard to electronic communications, each web page may be rated as a function of its identified URLs and third parties are permitted to access the web page as a function of the rating of the web page. Similarly, the rating may include rating each identified URL as appropriate or inappropriate. For example, a third party is blocked from accessing the web page (or website, as noted above) when the rating of the page based on its URLs is considered inappropriate (e.g., higher than a threshold amount) or when the percentage of inappropriate URLs relative to the total of inappropriate and appropriate URLs of the web page (or website) is greater than a threshold amount. The threshold amount may be a dynamic or weighted amount based on various factors. For example, the threshold amount may be a numerical total or a percentage such as approximately 50% or more, at least 10% or another amount.

Figure 5:
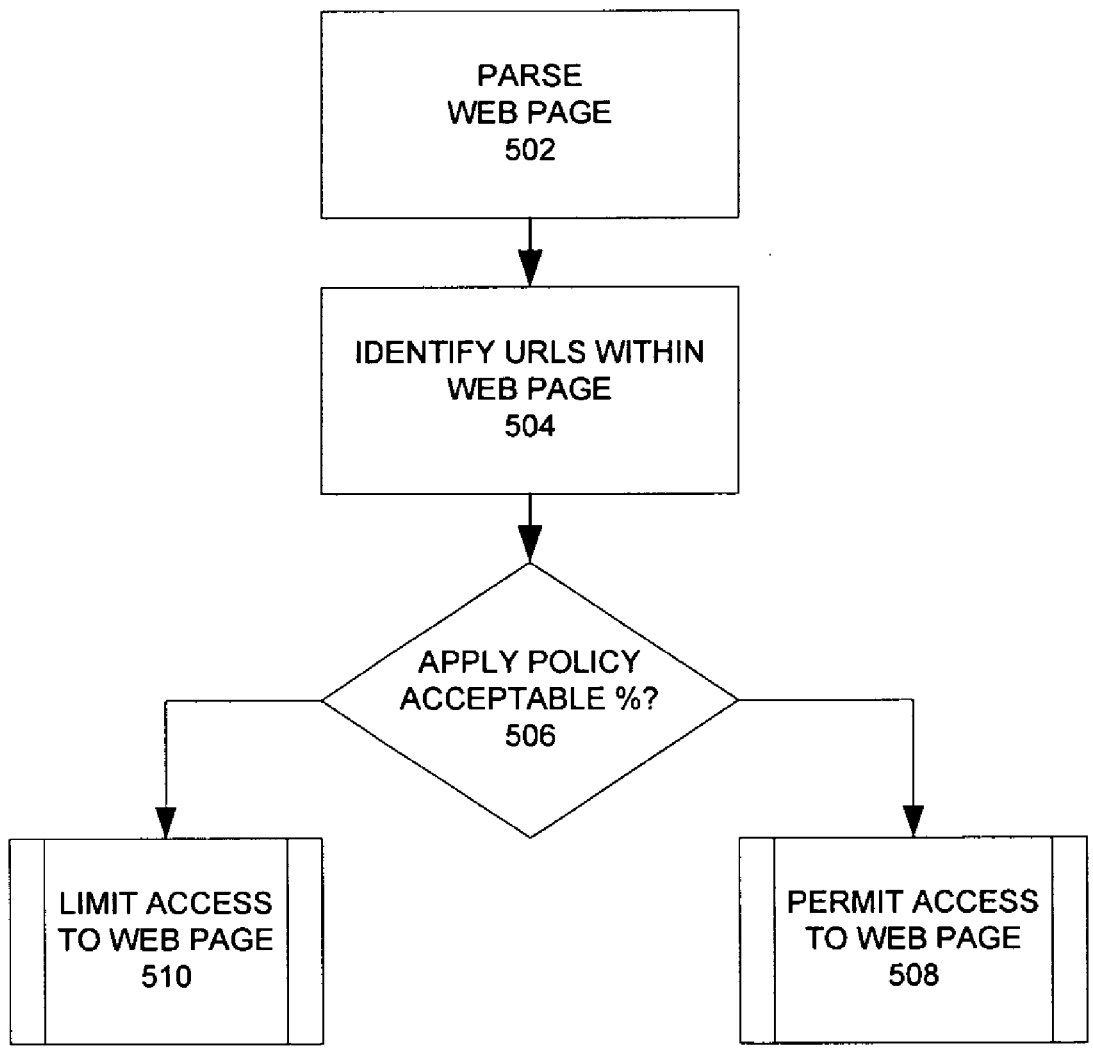
FIG. 5 is a flow chart of an exemplary embodiment of a method according to one embodiment of the invention for URL filtering to control access to pages or content within websites.

With specific reference to FIGS. 3 and 5, the server side hardware system 300 comprises a server computer 304 presenting a plurality of web pages 302 on a network 316 and having the capability of controlling access by third party users 314. The system 300 periodically parses each web page at 502 and identifies URLs within the web page at 504. The system 300 includes instructions for categorizing the web pages based on URLs therein by applying a policy at 506. The system 300 includes instructions 508 for permitting client access to a particular web page as a function of the categorization of the web page or for limiting access at 510. In one embodiment, the instructions are in the form of an allow/ block logic (policy) 318 and are stored on a computer readable medium and accessed by the server 304.

Figure 6:
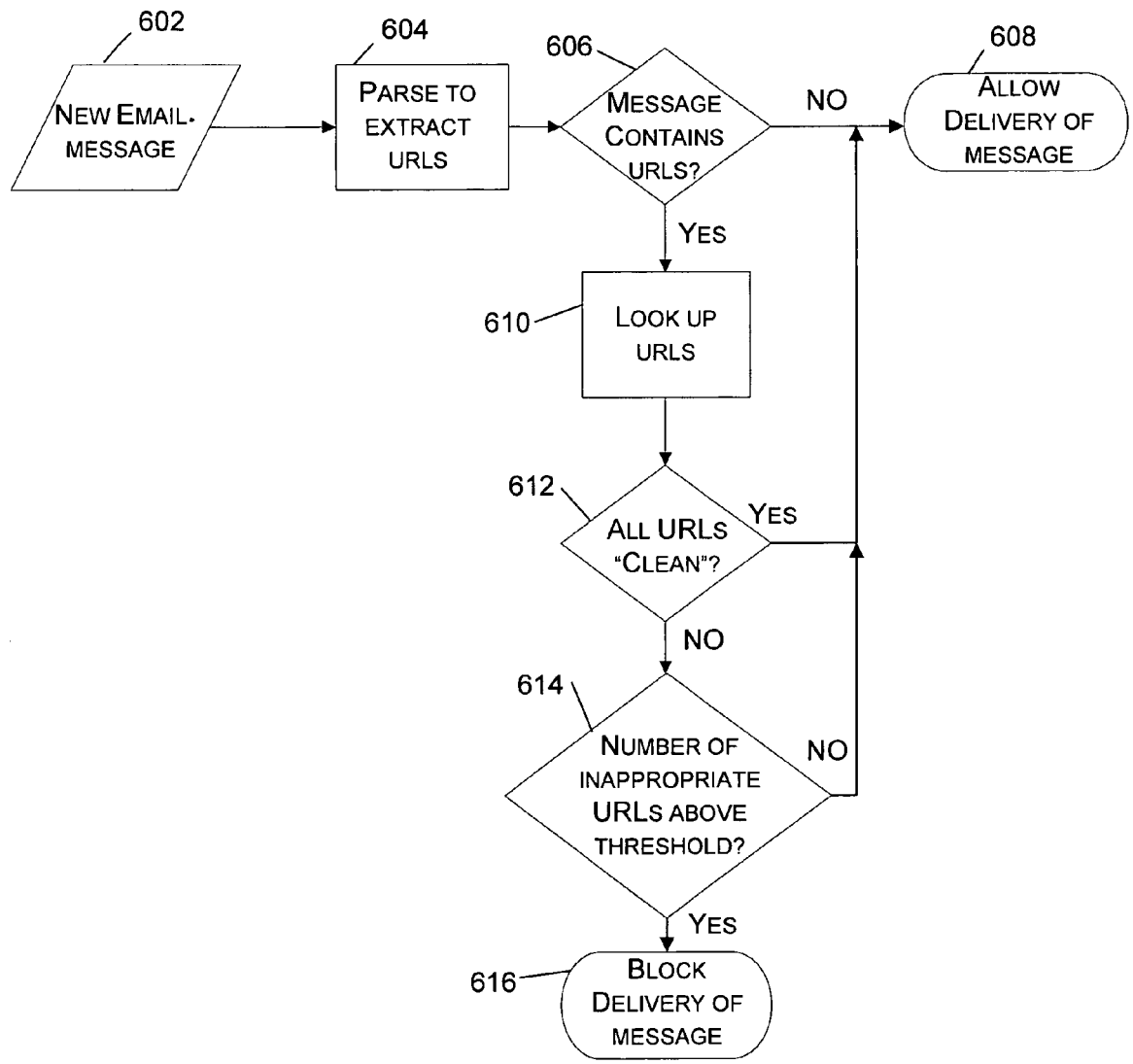
FIG. 6 is a flow chart of an exemplary embodiment of a method according to one embodiment of the invention for URL filtering to control email delivery.

FIG. 6 illustrates a system 600 such as a client or server system for handling an email. Instructions 602 receive the email and instructions 604 parse the received email to extract the URLs. At 606, instructions determine whether the email contains URLs. If the parsing reveals that the email does not contain a URL, the email is delivered to the client/addressee at 608. If the email contains URLs, the URLs are identified and at 610 a rating for each of the identified URLs is looked up (e.g., by a OLTK and CNS server accessing a URL database). If all URLs are appropriate or clean, delivery of the message is allowed at 608 so that the client is permitted to access the email. When the number of inappropriate URLs is below a threshold. Delivery of the email is blocked at 616 and the client is inhibited from reading the email when the number of inappropriate URLs is at or above the threshold. In one embodiment, the instructions are stored on a computer readable medium and accessed by the client computer 108.

Figure 7:
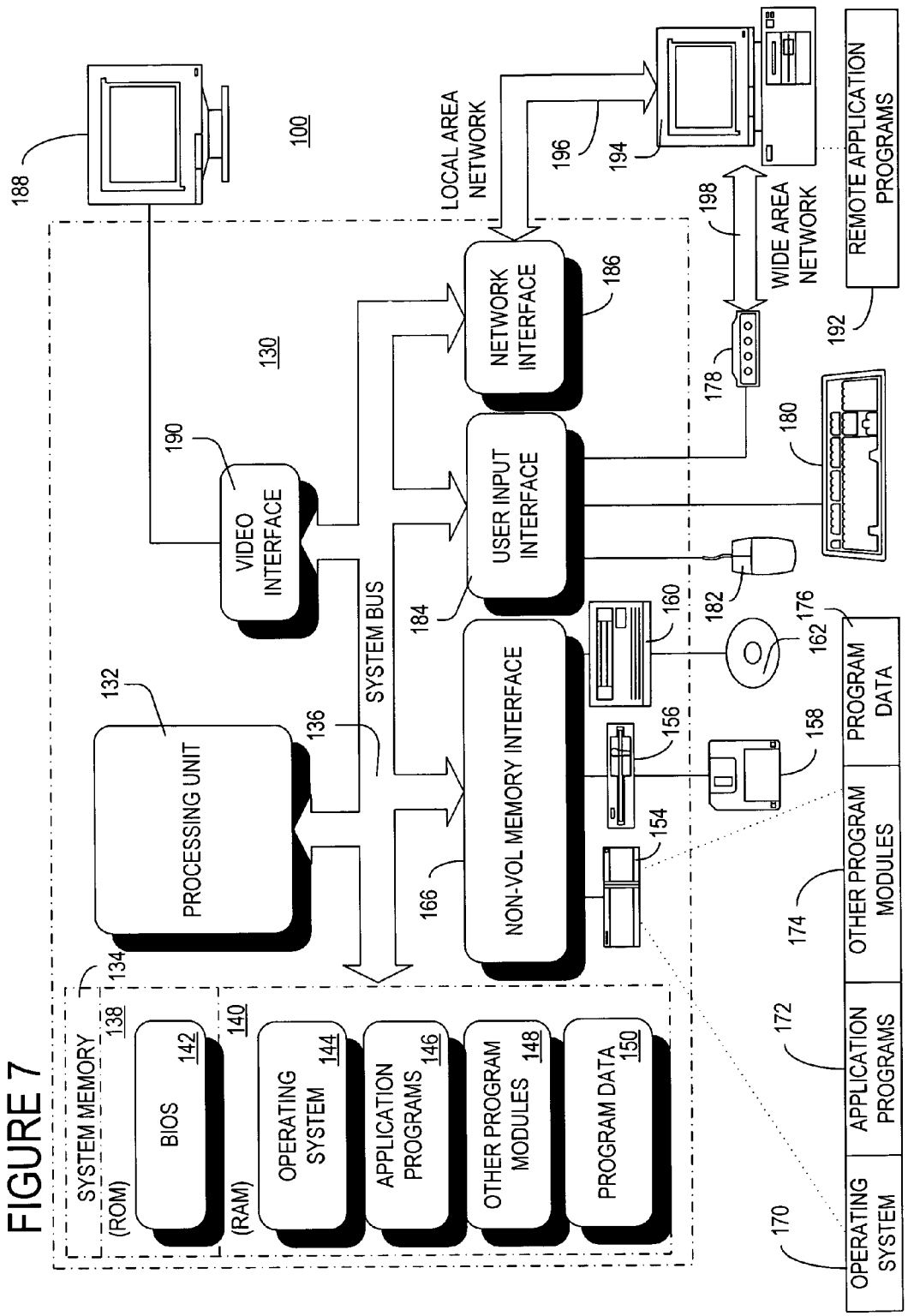
FIG. 7 is a block diagram illustrating one example of a suitable computing system environment in which one embodiment of the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 1-6 including, for example, parsing, identifying, categorizing, routing, permitting third parties to access, looking up a rating, designating, permitting the client to access, inhibiting the client to access, receiving electronic communications, storing the received electronic communications, categorizing the stored electronic communications, permitting client access, selectively sending a particular electronic communication, periodically categorizing, as noted herein.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for handling an electronic communication, said system including a computer readable storage medium having instructions stored thereon, when executed by a computer processor, to perform a method:
    receiving the electronic communication;
    parsing the received electronic communication to identify URLs within the received electronic communication;
    for each identified URL, sending a request to a categorizing server system to identify the category assigned to each identified URL, said categorizing server system employing a URL database to cross reference the identified URL and to maintain URL categories;
    rating each identified URL as appropriate or inappropriate as a function of the identified category corresponding to each identified URL; and
    routing the electronic communication as a function of the rating of each identified URL,
    wherein the electronic communication is not routed to an addressee if the percentage of identified inappropriate URLs of the electronic communication relative to the total of identified inappropriate URLs of the electronic communication and identified appropriate URLs of the electronic communication is greater than a threshold amount,
    wherein the electronic communication is routed to the addressee if the percentage of identified inappropriate URLs of the electronic communication relative to the total of identified inappropriate URLs of the electronic communication and identified appropriate URLs of the electronic communication is less than or equal to the threshold amount, and
    wherein the routing includes a policy including an allow/block logic which determines to route the electronic communication to the addressee when the policy indicates that the electronic communication passes the allow logic and fails the block logic and which determines to inhibit routing the electronic communication to the addressee when the policy indicates that the electronic communication fails the allow logic and passes the block logic.

2. The system of claim 1 wherein the received electronic communication comprises one or more electronic emails selected from the group comprising: an email, an instant message or a chat room statement.

3. The system of claim 1 wherein the threshold amount is a dynamic or weighted amount based on various factors.

4. The system of claim 1 wherein the threshold amount is at least approximately 50%.

5. The system of claim 1 wherein the threshold amount is at least substantially 10%.

6. The system of claim 1 wherein the threshold amount is greater than zero.

7. The system of claim 1 wherein the sending comprises connecting to an on-line look up service to determine the category of each identified URL.

8. The system of claim 1 wherein the identifying includes using an on-line look-up tool kit.

9. A system for controlling access by third parties to web pages of a website, said system including a computer readable storage medium having instructions stored thereon, when executed by a computer processor, to perform a method:
    parsing pages within a website;
    identifying URLs within the parsed web pages;
    categorizing the identified URLs by looking up the category of each identified URL via a categorizing server system;

rating each identified URL as appropriate or inappropriate as a function of identified category corresponding to each identified URL; and permitting a third party to access the web pages as a function of the rating of each identified URL, wherein the third party is blocked from accessing the web page if the percentage of identified inappropriate URLs of the web pare relative to the total of identified inappropriate URLs of the web page and identified appropriate URLs of the web page is greater than a threshold amount, wherein the third party is permitted to access the web page if the percentage of identified inappropriate URLs of the web pare relative to the total of identified inappropriate URLs of the web page and identified appropriate URLs of the web page is less than or equal to the threshold amount, and wherein the permitting includes a policy including an allow/block logic which determines to route the web page to the third party when the policy indicates that the web page passes the allow logic and fails the block logic and which determines to inhibit routing the web page to the third party when the policy indicates that the web page fails the allow logic and passes the block logic.

10. The system of claim 9 wherein the parsed page comprises one or more pages selected from the group comprising: one or more web pages of a group website, and one or more home pages.

11. The system of claim 9 wherein the threshold amount is a dynamic or weighted amount based on various factors.

12. The system of claim 9 wherein the threshold amount is at least approximately 50%.

13. The system of claim 9 wherein the threshold amount is at least substantially 10%.

14. The system of claim 9 wherein the threshold amount is greater than zero.

15. The system of claim 9 wherein looking up comprises connecting to an on-line look up service to determine the category of each identified URL.

16. The system of claim 15 wherein the connecting comprises accessing a category name service server employing a URL database to cross reference the URL and maintain URL categories.

17. The system of claim 9 wherein the identifying includes using an on-line look-up tool kit.

18. A system for handling an email, said system including a computer readable storage medium having instructions stored thereon, when executed by a computer processor, to perform a method:

receiving the email for presentation to a client;

parsing the received email to identify URLs within the parsed email;

looking up a rating for each of the identified URLs via a categorizing server system;

designating each identified URL as inappropriate or appropriate based on the rating of each identified URL;

permitting the client to access the email when the percentage of designated inappropriate URLs of the email relative to the total of designated inappropriate URLs of the email and designated appropriate URLs of the email is below a threshold; and inhibiting the client to access the email when the percentage of designated inappropriate URLs of the email relative to the total of designated inappropriate URLs of the email and designated appropriate URLs of the email is at or above the threshold, wherein the permitting includes a policy including an allow/block logic which determines to route the email to the client when the policy indicates that the email passes the allow logic and fails the block logic and which determines to inhibit routing the email to the client when the policy indicates that the email fails the allow logic and passes the block logic.

19. The system of claim 18 wherein a client is permitted to access the email if the email does not contain any URLs.

20. The system of claim 18 wherein the looking up includes using an on-line look-up tool kit.

21. A client side hardware system comprising:

a client computer having a memory and having capability for receiving electronic communications from a source for presentation to a client;

instructions for receiving an electronic communication from the source and storing the received electronic communication in the memory while initially inhibiting client access to the electronic communication;

instructions for categorizing the stored electronic communication based on the URLs therein by looking up the category of each identified URL via a categorizing server system, said categorizing server system employing a URL database to cross reference the URL and to maintain URL categories;

instructions for rating each identified URL as appropriate or inappropriate as a function of the identified category corresponding to each identified URL; and instructions for routing the electronic communication as a function of the rating of each identified URL, wherein the client is not permitted access to the electronic communication if the percentage of identified inappropriate URLs of the electronic communication relative to the total of identified inappropriate URLs of the electronic communication and identified appropriate URLs of the electronic communication is greater than a threshold amount, wherein the client is permitted access to the electronic communication if the percentage of identified inappropriate URLs of the electronic communication relative to the total of identified inappropriate URLs of the electronic communication and identified appropriate URLs of the electronic communication is less than or equal to the threshold amount, and wherein the instructions for permitting includes a policy including an allow/block logic which determines to route the electronic communication to the client when the policy indicates that the electronic communication passes the allow logic and fails the block logic and which determines to inhibit routing the electronic communication to the client when the policy indicates that the email fails the allow logic and passes the block logic.

22. The system of claim 21 wherein the received electronic communication comprises one or more electronic emails selected from the group comprising: an email, an instant message or a chat room statement.

23. The system of claim 21 wherein the instructions for categorizing include using an on-line look-up tool kit.

24. A server side hardware system comprising:

a server computer having a memory and having capability for receiving electronic communications from a source for presentation to a client, said electronic communication comprises one or more of the following: an email, an instant message or a chat room statement, said server being configured with executable instructions for:

defining a threshold value;

receiving an electronic communication from a source and storing the received electronic communication in the memory;

parsing the received electronic communication to identify URLs within the parsed electronic communication;

for each identified URL, sending a request to a categorizing server system to identify the category assigned to each identified URL, said categorizing server system employing a URL database to cross reference the URL and to maintain URL categories;

rating the stored electronic communication as appropriate or inappropriate based on the assigned category of each identified URL; and selectively sending the electronic communication to the client as a function of the rating of the electronic communication, wherein the electronic communication is not routed to the client if the percentage of identified inappropriate URLs of the electronic communication relative to the total of identified inappropriate URLs of the electronic communication and identified appropriate URLs of the electronic communication is greater than the threshold value, wherein the electronic communication is routed to the client if the percentage of identified inappropriate URLs of the electronic communication relative to the total of identified inappropriate URLs of the electronic communication and identified appropriate URLs of the electronic communication is less than or equal to the threshold value, and wherein the instructions for routing include a policy including an allow/block logic which determines to route the electronic communication to the client when the policy indicates that the electronic communication passes the allow logic and fails the block logic and which determine to inhibit routing the electronic communication to the client when the policy indicates that the electronic communication fails the allow logic and passes the block logic.

25. The system of claim 24 wherein the instructions for categorizing include using an on-line look-up tool kit.

26. A server side hardware system comprising:

a server computer presenting a plurality of websites having web pages on a network and having the capability of controlling a client's access to the web pages of the websites;

instructions for periodically rating a web page based on categories of the URLs therein, said categories of the URLs identified by a categorizing server system employing a URL database to cross reference the URL and maintain URL categories;

instructions for rating each identified URL as appropriate or inappropriate as a function of identified category corresponding to each identified URL; and instructions for routing the web page to the client as a function of the rating of each identified URL, wherein the client is not permitted access to the web page if the percentage of identified inappropriate URLs of the web pare relative to the total of identified inappropriate URLs of the web page and identified appropriate URLs of the web page is greater than a threshold amount, wherein the client is permitted access to the web page if the percentage of identified inappropriate URLs of the web pare relative to the total of identified inappropriate URLs of the web page and identified appropriate URLs of the web page is less than or equal to the threshold amount, and wherein the instructions for permitting include a policy including an allow/block logic which determines to route the web page to the client when the policy indicates that the web page passes the allow logic and fails the block logic and which determine to inhibit routing the web page to the client when the policy indicates that the web page fails the allow logic and passes the block logic.

27. The system of claim 26 wherein the parsed page comprises one or more pages selected from the group comprising: one or more web pages of a group website, and one or more home pages.

28. The system of claim 26 wherein the instructions for categorizing include using an on-line look-up tool kit.

29. A computer readable storage medium for handling an electronic communication, said medium including instructions stored thereon, when executed by a computer processor, to perform a method of:

receiving the electronic communication for presentation to a client;

parsing the received electronic communication to identify URLs within the parsed electronic communication;

for each identified URL, sending a request to a categorizing server system to identify the category assigned to each of the identified URLs by looking up the category of each identified URL via a categorizing server system, said categorizing server system employing a URL database to cross reference the URL and maintain URL categories;

designating each identified URL as inappropriate or appropriate based on its category;

permitting the client to access the electronic communication when the percentage of inappropriate URLs of the electronic commutation relative to the total of identified inappropriate URLs of the electronic commutation and identified appropriate URLs of the electronic commutation is below a threshold; and inhibiting the client to access the electronic communication when the percentage of inappropriate URLs of the electronic commutation relative to the total of identified inappropriate URLs of the electronic commutation and identified appropriate URLs of the electronic commutation is at or above the threshold, and wherein the permitting includes a policy including an allow/block logic which determines to route the electronic communication to the client when the policy indicates that the electronic communication passes the allow logic and fails the block logic and which determine to inhibit routing the electronic communication to the client when the policy indicates that the electronic communication fails the allow logic and passes the block logic.

30. A computer readable storage medium for controlling access by third parties to web pages of a website, said medium including instructions stored thereon, when executed by a computer processor, to perform a method of:

parsing web pages within a website to identify URLs within the parsed web pages;

for each identified URL, sending a request to a categorizing server system to identify the category of the identified URLs, said categorizing server system employing a URL database to cross reference the URL and maintain URL categories;

rating each identified URL as appropriate or inappropriate as a function of identified category corresponding to each identified URL; and permitting a third party to access the web pages as a function of the rating of the URLs, wherein the third party is blocked from accessing the web page if the percentage of identified inappropriate URLs of the web pare relative to the total of identified inappropriate URLs of the web page and identified appropriate URLs of the web page is greater than a threshold amount, wherein the third party is permitted to access the web page if the percentage of identified inappropriate URLs of the web pare relative to the total of identified inappropriate URLs of the web page and identified appropriate URLs of the web page is less than or equal to the threshold amount, and wherein the permitting includes a policy including an allow/block logic which determines to route the web page to the third party when the policy indicates that the web page passes the allow logic and fails the block logic and which determines to inhibit routing the web page to the third party when the policy indicates that the web page fails the allow logic and passes the block logic.

31. A computer readable storage medium for handling an email, said medium including instructions stored thereon, when executed by a computer processor, to perform a method of:

receiving the email;
parsing the received email;
identifying URLs within the parsed email;
for each identified URL, sending a request to a categorizing server system to identify the category assigned to each identified URL, said categorizing server system employing a URL database to cross reference the URL and maintain URL categories;

rating each identified URL as appropriate or inappropriate based on the identified categories of the identified URLs; and routing the email as a function of the rating of each identified URL, wherein the electronic communication is not routed to an addressee if the percentage of identified inappropriate URLs of the electronic communication relative to the total of identified inappropriate URLs of the electronic communication and identified appropriate URLs of the electronic communication is greater than a threshold amount, wherein the electronic communication is routed to the addressee if the percentage of identified inappropriate URLs of the electronic communication relative to the total of identified inappropriate URLs of the electronic communication and identified appropriate URLs of the electronic communication is less than or equal to the threshold amount, and wherein the routing includes a policy including an allow/block logic which determines to route the electronic communication to the addressee when the policy indicates that the electronic communication passes the allow logic and fails the block logic and which determines to inhibit routing the electronic communication to the addressee when the policy indicates that the electronic communication fails the allow logic and passes the block logic.

* * * * *